US010450073B2

(12) United States Patent
Schulz et al.

(10) Patent No.: US 10,450,073 B2
(45) Date of Patent: Oct. 22, 2019

(54) SEAT TRACK COVER (71) Applicant: Airbus Operations GmbH, Hamburg (DE)

(72) Inventors: Alexander Schulz, Itzehoe (DE); Lars Schomacker, Heinbockel (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/942,769

(22) Filed: Apr. 2, 2018

(65) Prior Publication Data
US 2018/0281973 A1 Oct. 4, 2018

(30) Foreign Application Priority Data

Mar. 31, 2017 (DE) .................. 10 2017 107 021

(51) Int. Cl.
*A47C 15/00* (2006.01)
*B64D 11/06* (2006.01)
(52) U.S. Cl.
CPC ........ *B64D 11/0696* (2013.01); *B64D 11/064* (2014.12)
(58) Field of Classification Search
CPC ........... B64C 1/20; B64C 1/18; B64D 11/064; B64D 11/0696; H02G 3/385; H02G 3/283
USPC ............................ 244/118.6, 118.1; 297/232
See application file for complete search history.

(56) References Cited

U.S. PATENT DOCUMENTS

| 4,723,732 | A | 2/1988 | Gorges | |
|---|---|---|---|---|
| 7,182,292 | B2 * | 2/2007 | Howard | B64D 11/0696 244/118.6 |
| 8,033,501 | B2 * | 10/2011 | Callahan | B64C 1/20 174/74 R |
| 9,248,911 | B2 * | 2/2016 | Kohn | B64C 1/20 |
| 9,834,299 | B2 * | 12/2017 | Hanna | H02G 3/385 |
| 9,868,506 | B2 * | 1/2018 | Hanna | H02G 3/385 |
| 2004/0155168 | A1 | 8/2004 | Matsushiro | |
| 2006/0097109 | A1 | 5/2006 | Laib et al. | |

(Continued)

FOREIGN PATENT DOCUMENTS

| DE | 3631097 | 3/1987 |
|---|---|---|
| DE | 102010049104 | 4/2012 |

(Continued)

OTHER PUBLICATIONS

German Search Report, dated Feb. 16, 2018, priority document.

*Primary Examiner* — Chi Q Nguyen
(74) *Attorney, Agent, or Firm* — Greer, Burns & Crain, Ltd.

(57) ABSTRACT

A seat track cover for a passenger seat of an aircraft is positionable on a seat track. The seat track cover is mechanically coupled at a first end to a seat leg structure of the passenger seat via a pivot joint. The seat track cover is arranged substantially parallel to the seat track and takes up a covering position which covers a seat track located thereebeneath when the passenger seat is in its working position. The seat track cover takes up a stowed position in a second state, wherein, in the stowed position, the seat track cover is pivotable out of the parallel plane with respect to the seat track via a pivoting movement about the pivot of the pivot joint. The transition from the covering position to the stowed position takes place via the pivoting movement about the first end of the seat track cover.

19 Claims, 11 Drawing Sheets (56) References Cited

U.S. PATENT DOCUMENTS

| | | | |
|---|---|---|---|
| 2007/0089746 A1* | 4/2007 | Mitchell | A62B 99/00 |
| | | | 128/205.15 |
| 2013/0278009 A1* | 10/2013 | Preisler | B60R 13/0275 |
| | | | 296/97.23 |
| 2014/0097662 A1 | 4/2014 | Koehn et al. | |
| 2014/0265463 A1 | 9/2014 | Phinney | |
| 2015/0145298 A1 | 5/2015 | Wotte et al. | |
| 2015/0225066 A1 | 8/2015 | Hanna et al. | |
| 2016/0101868 A1 | 4/2016 | Daouk | |
| 2018/0111689 A1* | 4/2018 | Huber | B64F 5/10 |

FOREIGN PATENT DOCUMENTS

| | | |
|---|---|---|
| DE | 102012218312 | 4/2014 |
| DE | 102014202287 | 8/2015 |
| EP | 2716547 | 4/2014 |
| EP | 2876048 | 5/2015 |
| FR | 2886226 | 12/2006 |
| WO | 2010067437 | 6/2010 |
| WO | 2010137970 | 12/2010 |

\* cited by examiner

SEAT TRACK COVER

CROSS-REFERENCES TO RELATED APPLICATIONS

This application claims the benefit of the German patent application No. 10 2017 107 021.4 filed on Mar. 31, 2017, the entire disclosures of which are incorporated herein by way of reference.

FIELD OF THE INVENTION

The present invention relates to a seat track cover for seat tracks in a passenger cabin.

BACKGROUND OF THE INVENTION

Seat tracks can be configured to mechanically couple, in a passenger cabin of a means of transport, preferably of an aircraft, one or more seats to the passenger cabin and, in particular, the structural elements arranged in the floor of the passenger cabin. Seat tracks can, in this case, allow a seat to be shifted such that, in the passenger cabin, a seat configuration and, in particular, the spacings between passenger seats or rows of passenger seats arranged one behind another can be adapted. To this end, the seat tracks usually have an elongate extent in the direction of the desired shifting direction of the seats.

In addition, the free locations of the seat tracks, which are not occupied by a passenger seat, are covered with seat track covers for protection from soiling. Once the seat configuration has been set or undertaken in the regions of the seat tracks in which there is no seat leg, a track cover can be arranged on the seat track such that the seat track is protected from the ingress of foreign bodies and dirt particles. This necessary cover is removable when passenger seats or seat systems are removed or installed. In the event of a possible cabin layout alteration, it is therefore advantageous for the covering of the seat track to accompany the shifting of the seats.

EP 2716547 A2 describes a solution with a length-variable seat track cover which adapts to the seat leg of the next seat by way of flexible portions when the seat is shifted.

EP 2876048 A1 discloses a seat track cover which allows length adaptation of the seat track cover with telescopic elements.

The possible solutions described in the prior art have the common feature that the seat track cover, at least to some extent, always remains positioned on the seat track. This therefore needs to be taken into consideration when seat benches or seats are pushed together on the seat tracks.

SUMMARY OF THE INVENTION

An object of the invention can be considered that of specifying a track cover for seat tracks, which allows simplified and easier alteration of a seat configuration. For this purpose, it is necessary for the seat track covers to be able to be stowed in a space-saving and flexible manner and for easy assembly to be allowed.

A seat track cover for a passenger seat of an aircraft is provided, which can be positioned on a seat track. According to the invention, the seat track cover is mechanically coupled at a first end to a seat leg structure of the passenger seat via a pivot joint. It is arranged substantially parallel to the seat track and thus takes up a covering position which covers a seat track located therebeneath when the passenger seat is in its working position. The seat track cover takes up a stowed position in a second state, which allows the passenger seats to be stowed in a space-saving manner, wherein, in the stowed position, the seat track cover is pivotable out of the parallel plane with respect to the seat track by way of a pivoting movement about the pivot of the pivot joint. The transition from the covering position to the stowed position takes place via the pivoting movement about that end of the seat track cover that is mechanically coupled to the seat leg structure. The pivoting movement is initiated by a triggering mechanism operatively connected to the seat track cover.

Also specified are a passenger seat and a seat arrangement for a passenger cabin of an aircraft.

Developments of the invention can be gathered from the following description.

BRIEF DESCRIPTION OF THE DRAWINGS

The illustrations in the figures are schematic and not true to scale. Where identical reference numerals are used in the following description of the figures, these refer to identical or similar elements.

DETAILED DESCRIPTION OF THE PREFERRED EMBODIMENTS

Figure 1:
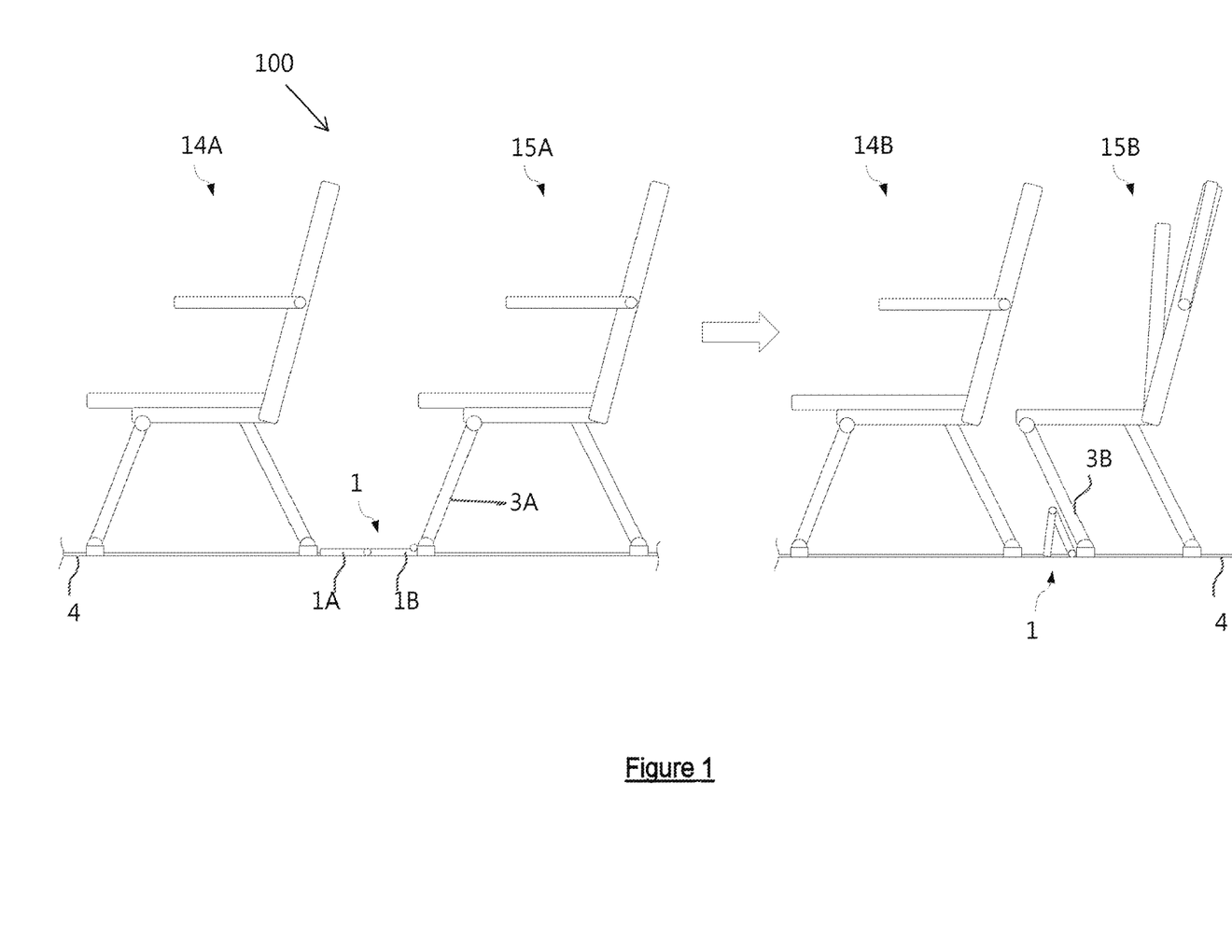
FIG. 1 schematically shows a side view of the covering position and stowed position of the foldable seat track cover between two passenger seats.

FIG. 1 shows, on the left-hand side, a passenger seat arrangement 100 in a configuration of passenger seats with a front/rear passenger seat in a working position 14A, 15A. In this arrangement, the passenger seats 14 and 15 can be used and a seat track cover 1 has been applied to the seat track 4, such that the seat track 4 is protected from the ingress of foreign bodies and dirt particles in this region. The seat track cover 1 having a first and a second segment 1A, 1B is configured in a hinged manner and can, as a result of the second segment 1B being folded up and the first segment 1A being folded in, free up the seat track region between the seats and allow the front seat leg 3 of the passenger seat 15B to be rotated and the front passenger seat 14B to be shifted. This configuration of passenger seats 14B, 15B, after the folding of the seat track cover 1 and with the rear passenger seat in a stowed position, is illustrated in the right-hand part of the figure.

Figure 2A:
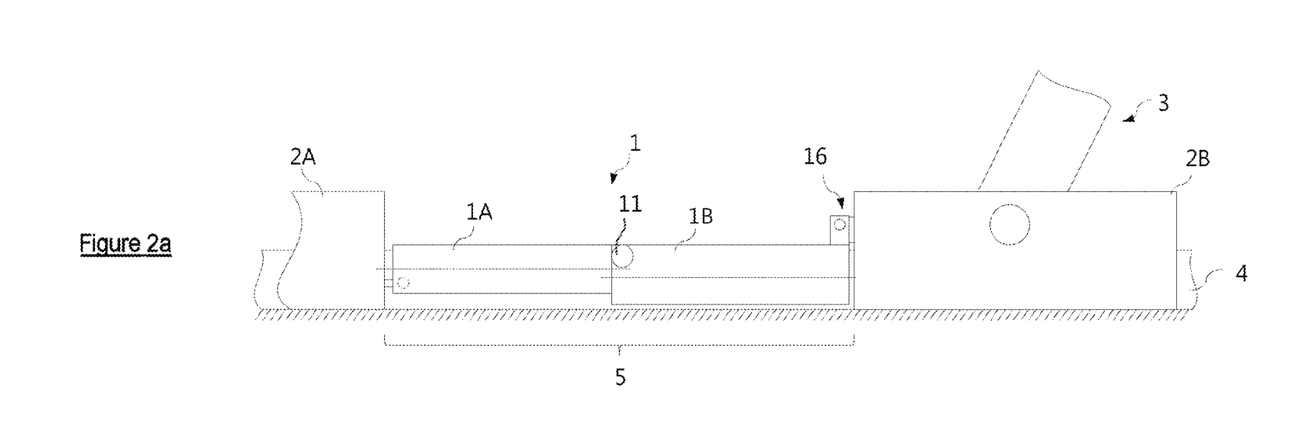
FIGS. 2a and 2b show side views of the foldable seat track cover in its covering position and stowed position with a part of the seat leg.

FIG. 2a shows a side view of the seat track cover 1 in a preferred exemplary embodiment as a foldable seat track cover 1 with two segments 1A and 1B, and a part of a seat fitting 2A of the front passenger seat 14 and a seat fitting 2B with a part of a seat leg 3 of the rear passenger seat 15. The two segments 1A and 1B, also known as cover elements, are connected together via a joint with a pivot 11. The seat leg 3 is in the working position. The passenger seat arrangement with the front and rear passenger seat 14, 15 can be used by passengers. In this figure, the seat track cover 1 takes up a covering position and thus covers a free region 5 of a seat track 4 between the passenger seats. The longitudinal axes of the first segment 1A and of the second segment 1B take up a substantially horizontal orientation in the covering position. They are arranged substantially parallel to the seat track 4. Via a hinge 16, the seat track cover 1 is connected to the seat fitting 2B, wherein the seat track cover 1 is pivotable about the pivot of the hinge 16.

Figure 2B:
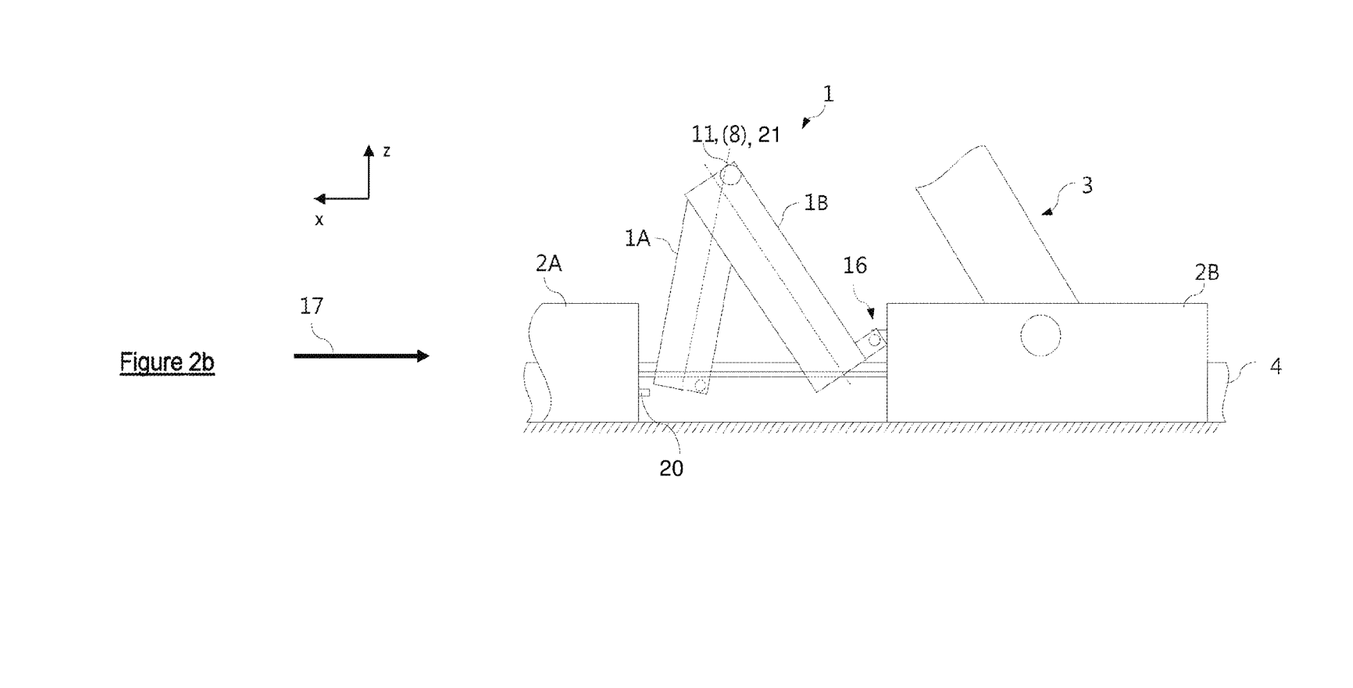

FIG. 2b shows a side view of the foldable seat track cover 1 in the stowed state of the passenger seat 15. As shown on the right-hand side in FIG. 1, the rear passenger seat 15 was folded in with its front leg 3 and thus space was freed up for shifting the front passenger seat 14 on the seat track 4. At least the seat fitting 2B and the seat leg 3 of the rear passenger seat 15 are now in the stowed position. The folding of the seat track cover 1 takes place by the shifting of the passenger seats in a shifting direction 17 counter to the x direction. In the process, the seat track cover 1 takes up a stowed position similar to the stowed position of the seat leg 3. Via the pivot 11, an articulated connection is established between the segments 1A and 1B. The hinge 16 ensures the upward flapping movement of the second segment 1B when the first segment 1A is run into by the front passenger seat 14 with the seat fitting 2A as a result of the rearward movement. A spring element 8, preferably a torsion spring, in the pivot 11 creates a restoring force which forces the two segments 1A, 1B into the covering position as soon as the passenger seats are transferred back into the original configuration (working position). The first segment 1A and the second segment 1B of the foldable seat track cover 1 are transferred from a covering position (see FIG. 2a) into the stowed position. A pushing element 20, which is arranged on the seat fitting 2A and pushes the first segment 1A out of the covering position as a result of the shifting of the front seat 14, simplifies the operation and flapping counter to the restoring force of the torsion spring 8. The pivot 11 comprises a triggering mechanism 21 when acted on by the pushing element 20 to initiate pivoting movement of the seat track cover 1 about hinge 16. The first segment 1A is flapped partially into the second segment 1B. In the stowed position, the two longitudinal axes of the segments 1A and 1B substantially form an acute angle. Virtually complete flapping of the segment 1A into the segment 1B is likewise conceivable.

Figure 3:
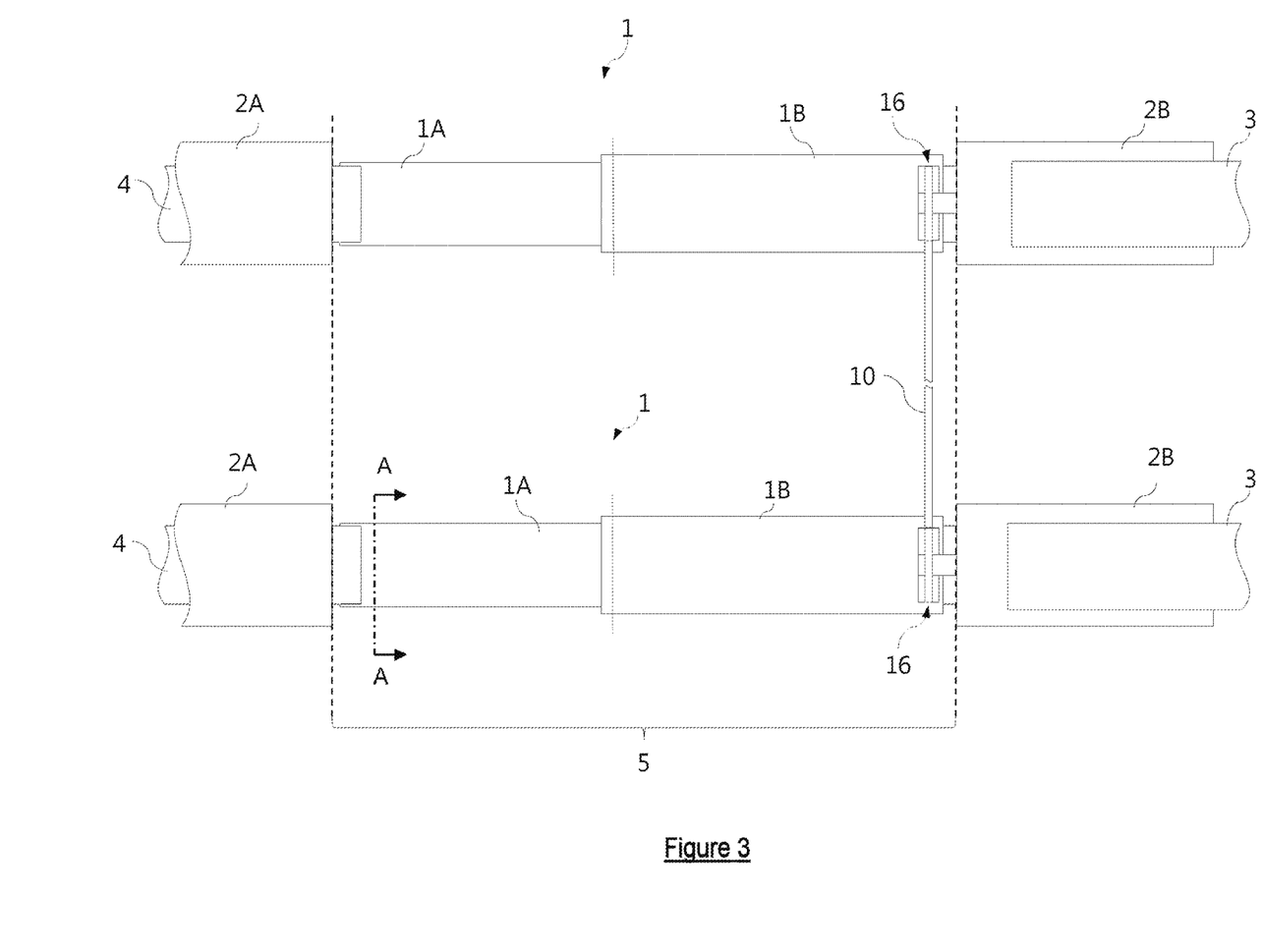
FIG. 3 shows a plan view of two foldable seat track covers according to FIG. 2 in the covering position on two seat tracks.

FIG. 3 shows a view from above of two foldable seat track covers 1 according to FIG. 2 in a parallel arrangement on two seat tracks 4. Arranged on the two seat tracks 4 are preferably a seat frame for a front passenger seat or a front row of passenger seats (with seat fittings 2A visible) and also a seat frame for a rear passenger seat or rear row of passenger seats (seat fittings 2B and seat legs 3 visible). The two seat track covers 1 with the segments 1A and 1B are illustrated in the covering state. The seat legs 3 take up the working position in this arrangement of the passenger seats. The segments 1A and 1B cover substantially the free regions 5 of the seat tracks 4 between the passenger seats in the covering state. One possible, advantageous addition is a strut-like cross connection 10 which connects the two hinges 16 together and supports and synchronizes the flapping movement. The label A-A in the bottom part of the figure indicates a section (see FIG. 4).

Figure 4:
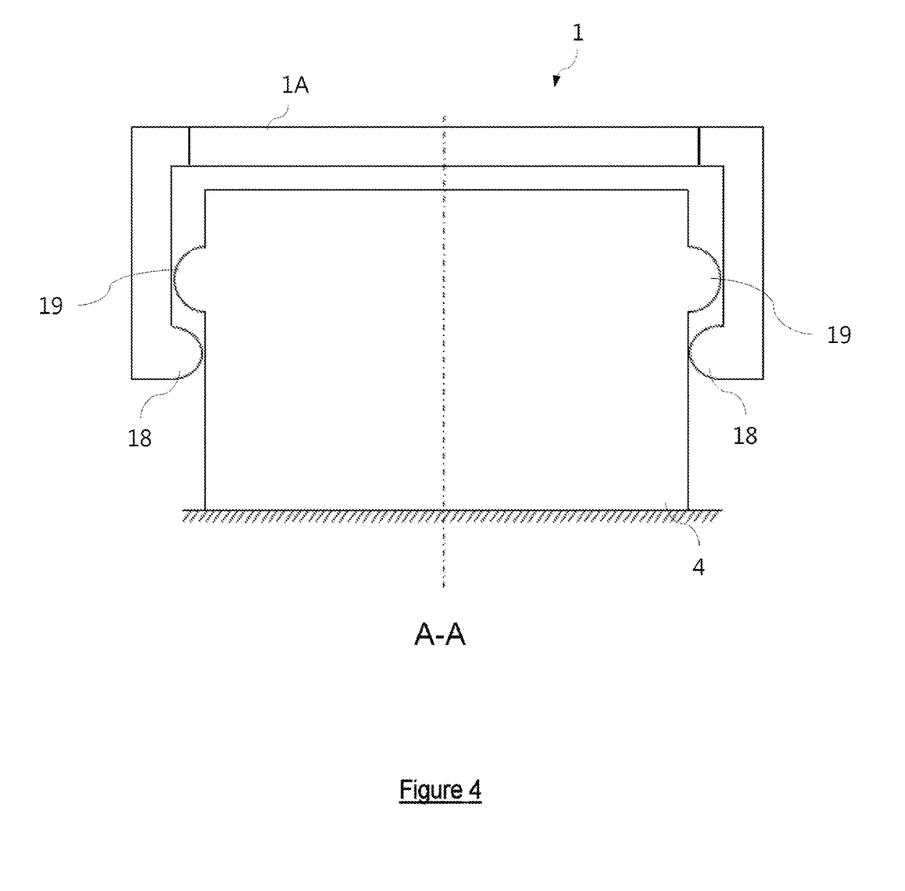
FIG. 4 shows a cross section of the seat track with the guide edge and the seat track cover with the guide elements.

FIG. 4 shows the section A-A indicated in FIG. 3. The seat track 4 has, on both sides, in each case a substantially semicircular guide edge 19. The seat track cover 1 has lateral guide elements 18 which engage beneath the guide edge 19. The guide elements 18 guide the foldable seat track cover 1, in particular the segment 1A, along the guide edge 19 while the seat track cover 1 is being moved from the covering position into the stowed position and vice versa. It is also conceivable for the guide elements to be able to be designed in some other way in further embodiments of the invention corresponding to the shaping of the guide edge 19. However, the essential function of the guide elements 18 is the holding and shifting function of the front end of the segment 1A on the seat track 4.

Figure 5:
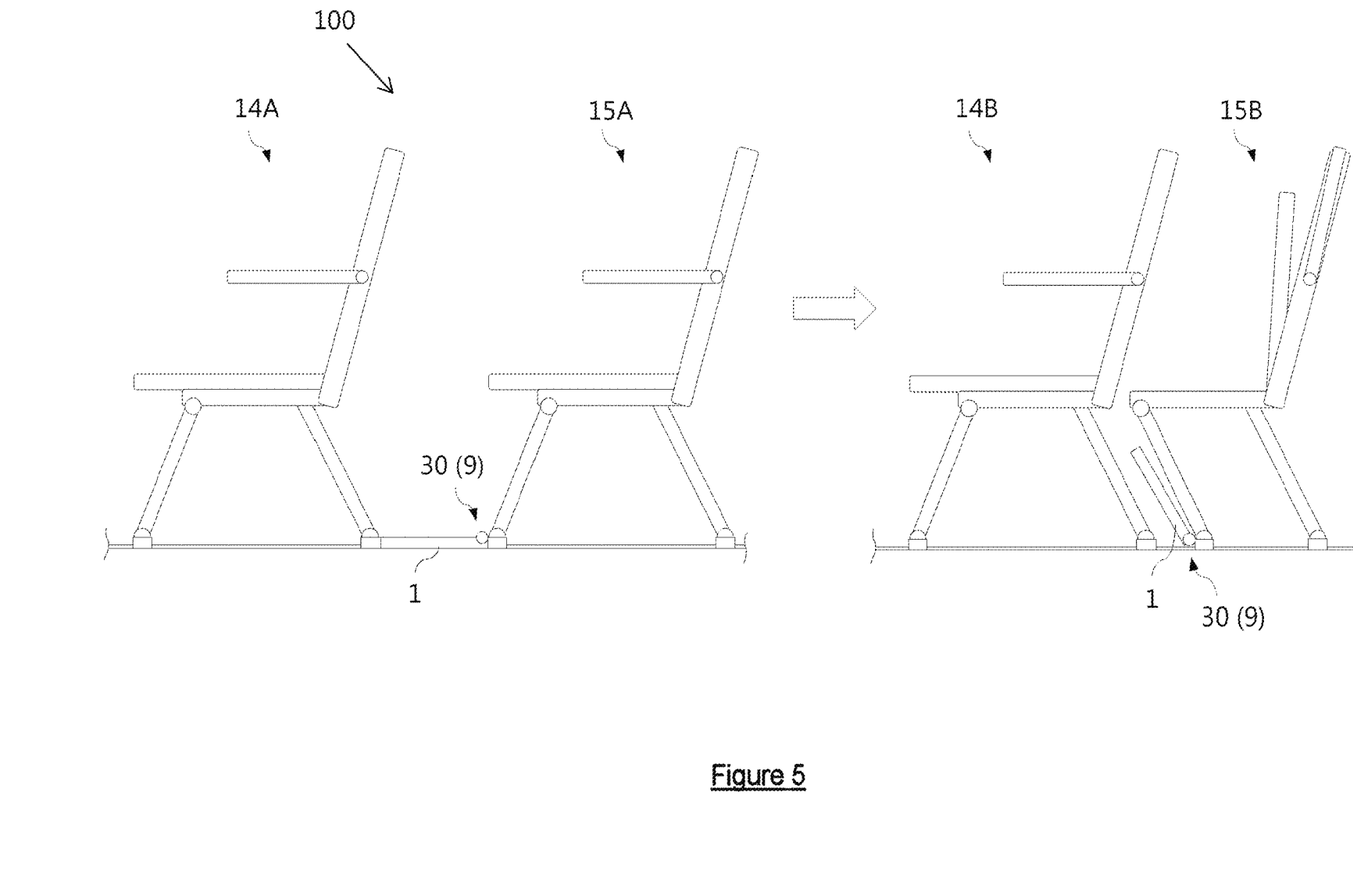
FIG. 5 schematically shows a side view of the covering position and stowed position of the hinged seat track cover in a further exemplary embodiment with a transmission mechanism and drive wheel between two passenger seats.

FIG. 5 shows, in a further alternative embodiment, a flexibly adaptable seat track cover 1 with a transmission mechanism 30. Schematically shown on the left-hand side is the configuration of passenger seats 14 and 15 before any flapping of the seat track cover 1 with the front/rear passenger seat in the working position 14A, 15A. In this position, the seat track cover 1 serves to cover the seat track in order to prevent soiling. The configuration of passenger seats for stowing the rear seat 15 after the seat track cover 1 has been flapped by way of the transmission mechanism 30 and the drive wheel 9 and also the front/rear passenger seat in the stowed position 14B, 15B is illustrated schematically in the right-hand part of the figure.

Figure 6A:
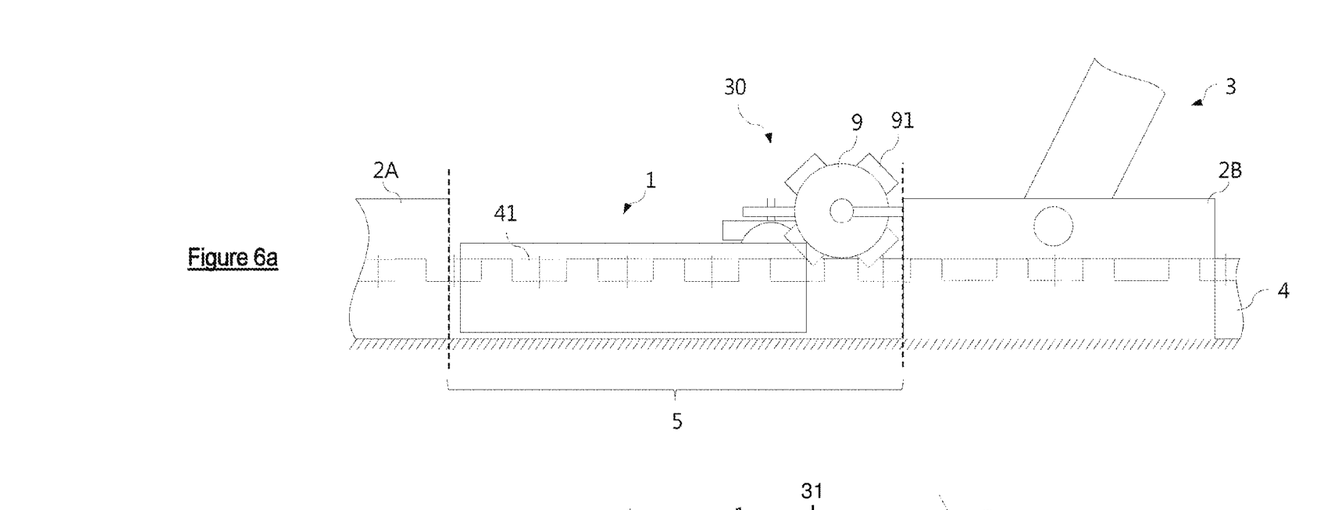
FIGS. 6a and 6b show the hinged seat track cover in the further exemplary embodiment with the transmission mechanism and drive wheel in the covering position and stowed position with a part of the seat leg.

FIG. 6a shows a side view of the seat track cover 1 in the further embodiment according to FIG. 5 as a hinged seat track cover 1 with the transmission mechanism 30 and the drive wheel 9. The seat fitting 2A of the front passenger seat 14 and the seat fitting 2B with the part of the seat leg 3 of the rear passenger seat 15 is fastened to the seat track 4. The seat leg 3 is in the working position. In this figure, the seat track cover 1 is taking up the covering position and thus covering substantially the free part 5 of the seat track 4 between the passenger seats. The transmission mechanism 30 is configured as a linkage arrangement and gearwheel arrangement and is connected laterally to the seat track cover 1 (see FIG. 7). Essentially, the drive wheel 9 is fixed to the seat fitting 2B of the rear passenger seat 15. The drive wheel 9 has, on its outer circumference, a plurality of teeth 91. The seat track 4 has cutouts, preferably bores 41, in which the teeth 91 of the drive wheel 9 engage during a movement of the seat fitting 2B in or counter to the x direction, and thus allow the drive wheel 9 to rotate. This rotation is converted into a rotational movement via the linkage and gearwheel arrangement of the transmission mechanism 30, said rotational movement pivoting the seat track cover 1 upwards or downwards. The wheel 9 and the transmission mechanism 30 together comprise a triggering mechanism 31 which, when moved, initiate pivoting movement of the seat track cover 1 about hinge 16.

Figure 6B:
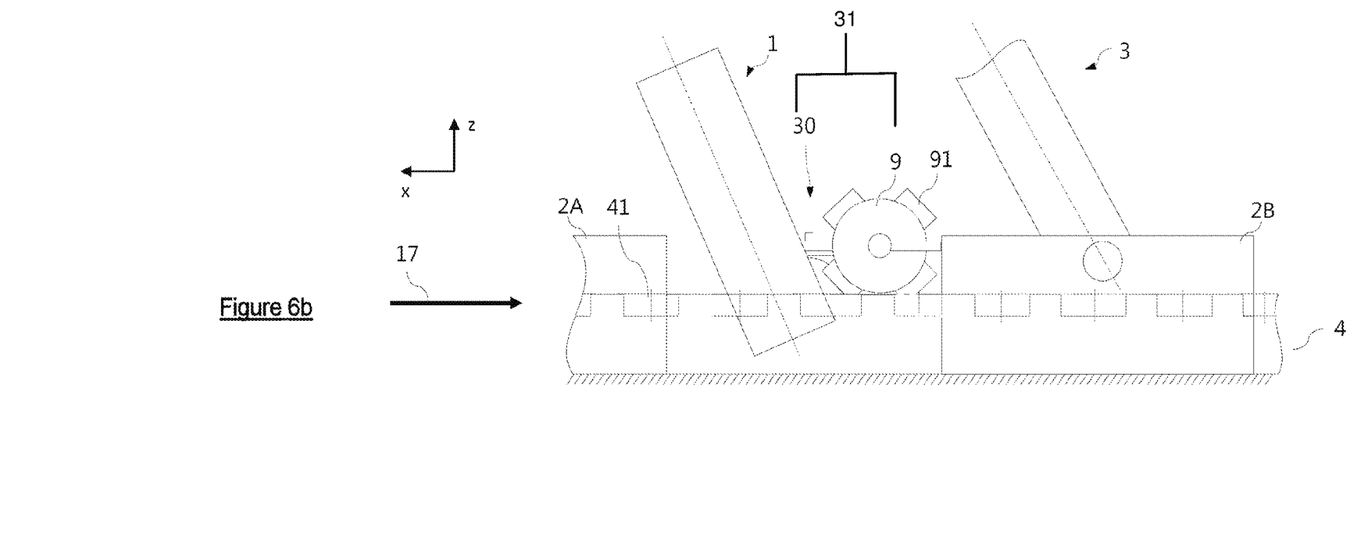

FIG. 6b shows a side view of the hinged seat track cover 1 with the seat fittings 2A and 2B of the front and of the rear passenger seat and the seat leg 3 in the stowed position. The movement of the seat fitting 2B in a pushing or shifting direction 17 counter to the x direction sets the drive wheel 9 in rotation on account of the engagement of the teeth 91 in the bores 41. The coupled linkage and gearwheel arrangement of the transmission mechanism 30 flaps the seat track cover 1 upwards. The seat track cover 1 takes up the stowed position in a similar manner to the stowed position of the seat leg 3 and requires only little space in the region of the seat track 4. The longitudinal axis of the seat track cover 1 and the longitudinal axis of the seat leg 3 take up a substantially parallel orientation with respect to one another.

Figure 7:
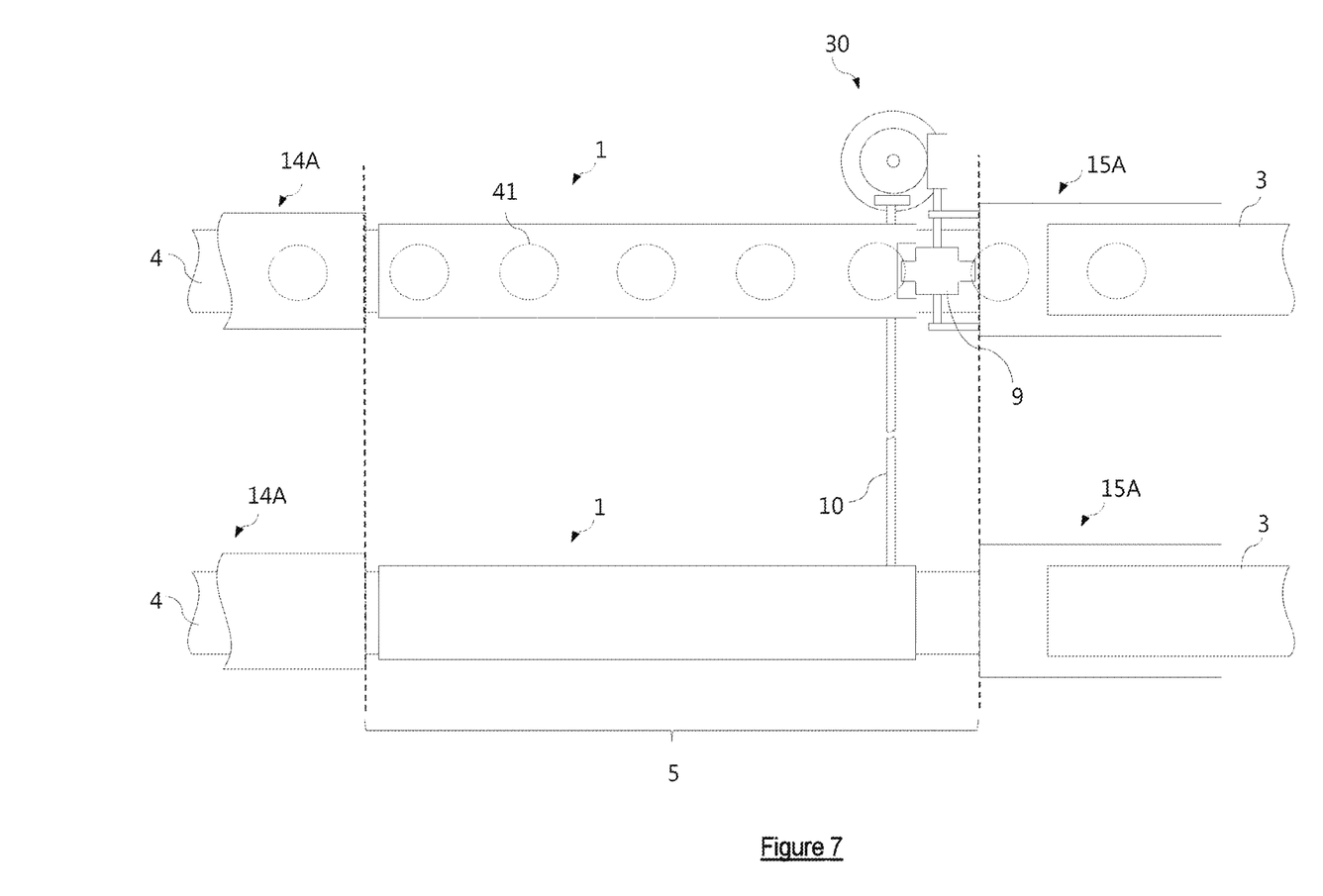
FIG. 7 shows a plan view of two hinged seat track covers with a transmission mechanism and a drive wheel in the covering position on two seat tracks.

FIG. 7 shows, in the plan view, two hinged seat track covers 1 in the embodiment having the transmission mechanism 30 and the drive wheel 9 in a parallel arrangement on two seat tracks 4 for use for a passenger seat arrangement 100 with front and rear passenger seats 14 and 15. The two seat track covers 1 are illustrated in the covering state. The seat legs 3 take up the working position in this arrangement of the passenger seats. The figure shows the arrangement of the bores 41 in one of the seat tracks 4. These bores/cutouts are likewise present in the second seat track 4 but are not shown. The seat track covers 1 cover substantially the free regions 5 of the seat tracks 4 between the passenger seats 14 and 15. The strut-like cross connection 10 between the two hinged seat track covers 1 allows, in a preferred embodiment, the use of only one transmission mechanism 30 with a drive wheel 9. The cross strut 10 transmits the introduced torque to the adjacent seat track cover 1 of the second seat track 4. The second seat track cover 1 then flaps into the stowed position in an analogous manner to the first seat track cover 1 (see FIG. 6b).

Figure 8:
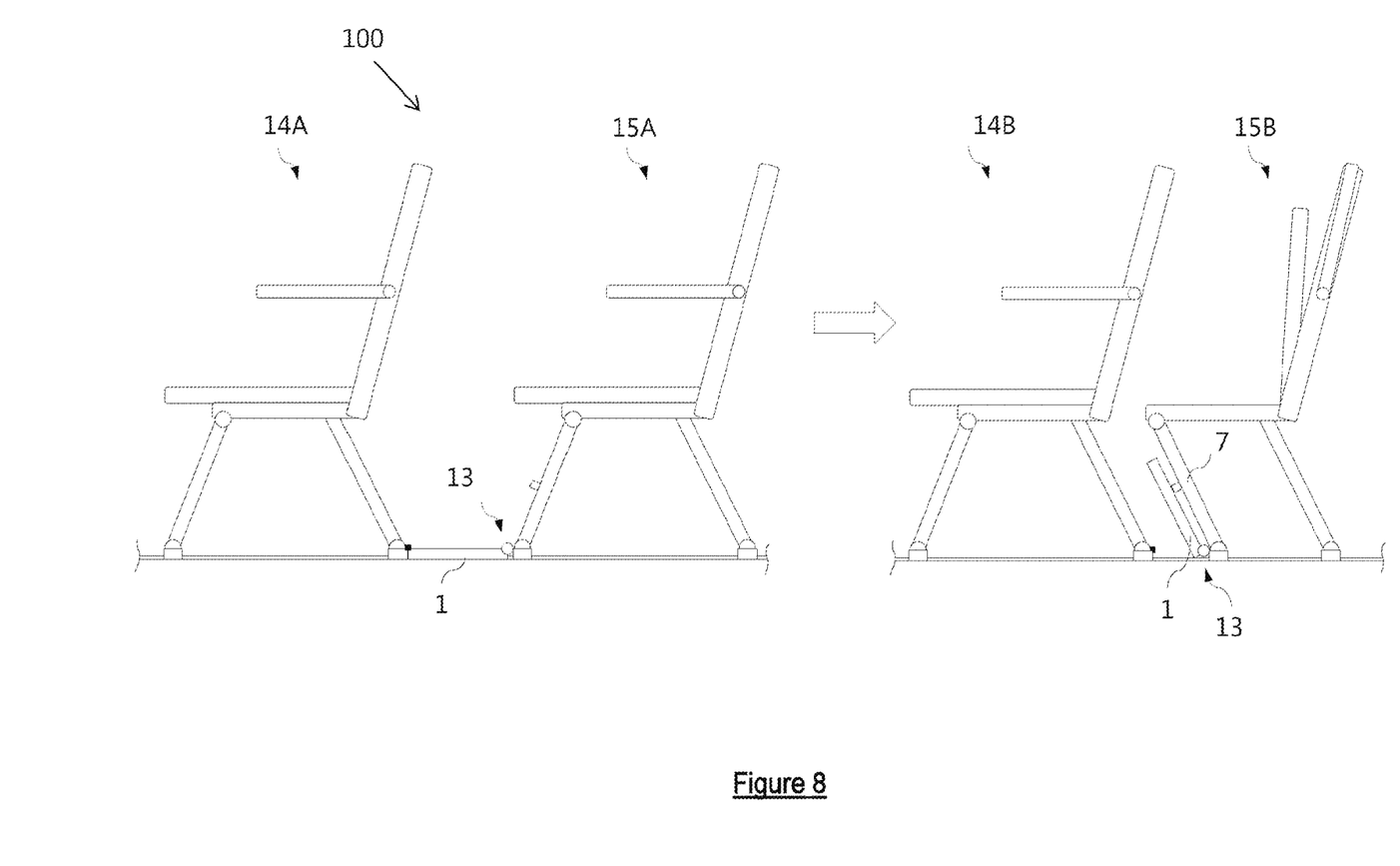
FIG. 8 schematically shows a side view of a third exemplary embodiment with the hinged seat track cover with a spring mechanism between two passenger seats.

FIG. 8 schematically shows, in a third embodiment, in the left-hand part, the configuration of passenger seats 14 and 15 before the flapping of the seat track cover 1 with a spring mechanism 13 in the region of the attachment of the seat track cover 1 to the passenger seat 15. The front and the rear passenger seat in the working position 14A, 15A for use as a passenger seat arrangement with a front and a rear row of seats is shown here. The configuration of passenger seats after the flapping of the seat track cover 1 with the spring mechanism 13 and at least the rear passenger seat 15 into the stowed position 15B is illustrated in the right-hand part of the figure.

Figure 9A:
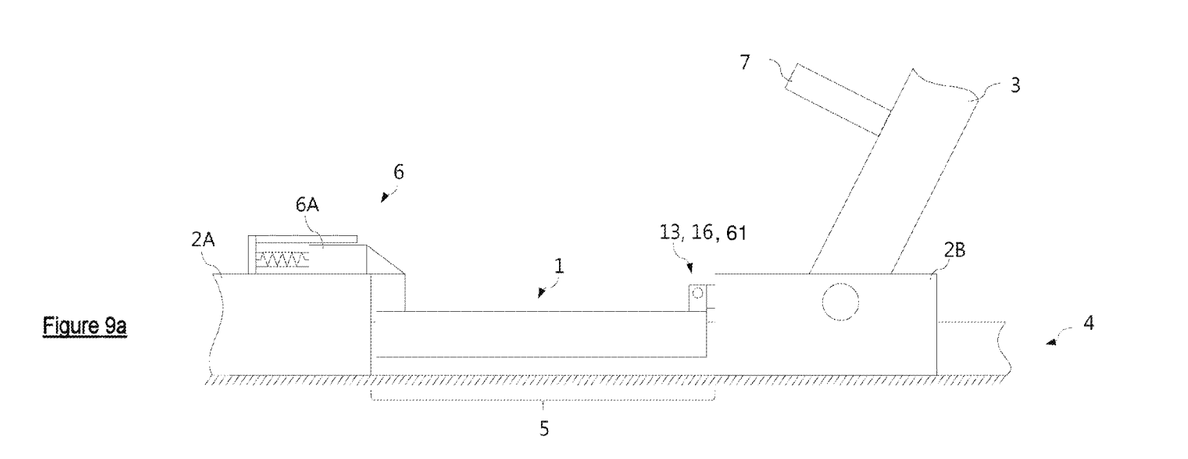
FIGS. 9a and 9b show side views of the hinged seat track cover with the spring mechanism in the covering position and stowed position with a part of the seat leg.

FIG. 9a shows, in a side view, the flexible seat track cover 1 in the third exemplary embodiment as a hinged seat track cover 1 with a spring mechanism 13 and a closure mechanism 6 and also a magnet holder 7. The figure shows the part of the seat fitting 2A of the front passenger seat and the seat fitting 2B with a part of the seat leg 3 of the rear passenger seat. The seat leg 3 of the rear passenger seat is equipped with a magnet holder 7 which, in the working position (use position of the passenger seat), is positioned such that it cannot exert any magnetic force on the seat track cover 1. The seat track cover 1 is attached to the seat fitting 2B of the rear passenger seat 15 in an articulated manner, preferably by means of a hinge 16. Integrated at the hinge 16 is preferably a torsion spring which forms the spring mechanism 13. A closure plug 6A, which is arranged advantageously on the seat fitting 2A of the front passenger seat, keeps the seat track cover 1 in the covering position on the seat track 4 counter to a restoring force of the spring mechanism 13. The seat track cover 1 covers, in the covering state, substantially the free region 5 of the seat track 4 between the passenger seats.

Figure 9B:
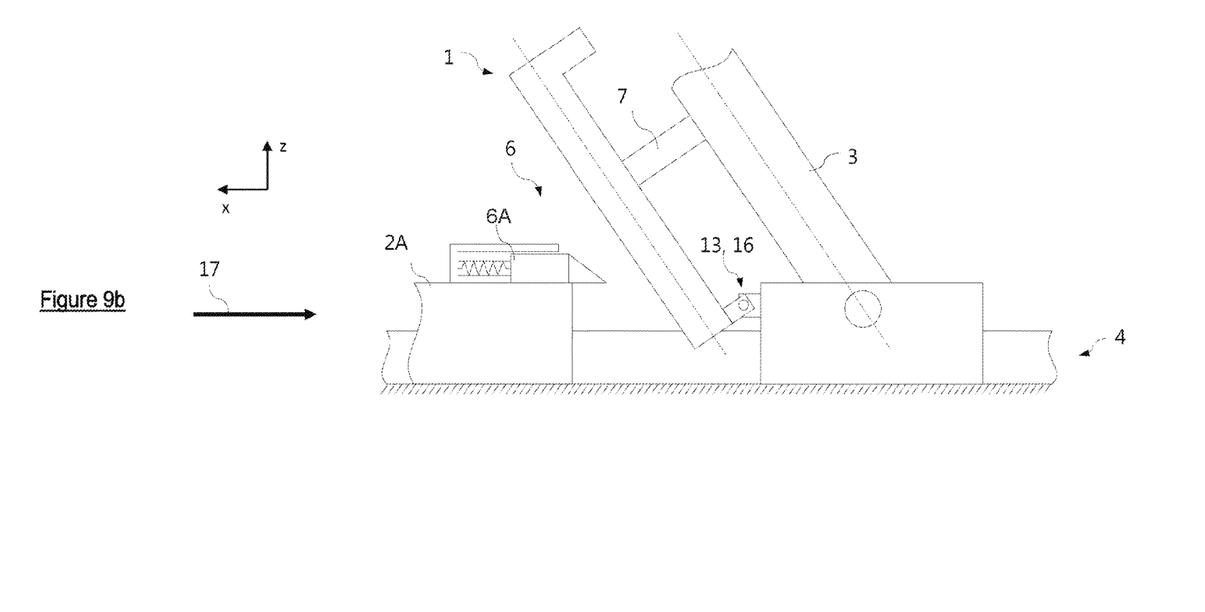

FIG. 9b shows a side view of the hinged seat track cover 1 in the stowed state of the rear passenger seat 15 with the seat leg 3 flapped back. The spring mechanism 13 is advantageously configured with the torsion spring. The restoring force of the torsion spring allows the automatic flapping open of the seat track cover 1 as soon as the latter is released via loosening of the closure plug 6A of the closure mechanism 6. When the seat track cover 1 has been flapped up, the seat track region is free for the shifting of the front seat 14 and the stowed position of the rear seat 15 can be taken up. The longitudinal axes of the seat track cover 1 and of the seat leg 3 take up a substantially parallel orientation with respect to one another. The magnet holder 7 firmly retains the seat track cover 1 in the stowed position on the seat leg 3 and at the same time allows slight releasing of the seat track cover 1 as soon as a return configuration takes place. At least for the retaining position, the seat track cover 1 is equipped with magnetically active materials in the corresponding region. The spring mechanism 13 comprises a triggering mechanism 61 so that when the end of the seat track cover opposite the hinge 16 is released, initiates a pivoting movement of the seat track cover 1 about the hinge 16.

Figure 10:
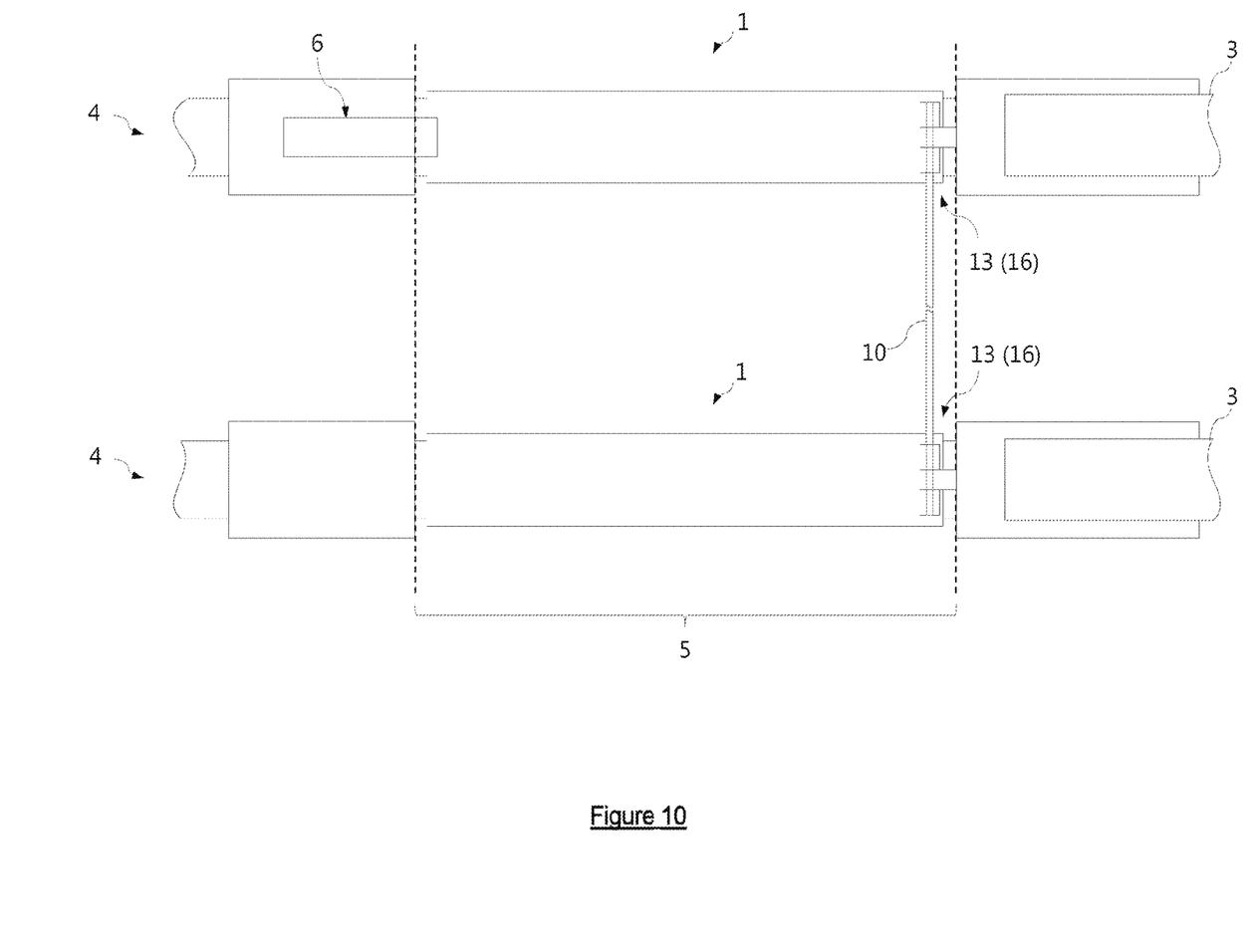
FIG. 10 shows a plan view of two hinged seat track covers with a spring mechanism and a torsion spring in the covering position on two seat tracks.

FIG. 10 shows the third exemplary embodiment in the view from above for the use for a passenger seat arrangement 100 with front and rear passenger seats 14 and 15. Two hinged seat track covers 1 each with the spring mechanism 13 in a parallel arrangement on two seat tracks 4 are illustrated in the covering state. The seat legs 3 take up the working position. The seat track covers 1 cover substantially the free regions 5 of the seat tracks 4 between the passenger seats. The closure mechanism 6 is closed and the spring mechanism 13, preferably the torsion spring, is tensioned. The strut-like cross connection 10 allows the (optional) use of only one closure mechanism 6. The cross connection 10 transmits the introduced torque to the adjacent seat track cover 1 of the second seat track 4. The cross connection 10 synchronizes the movement of the hinged seat track covers 1.

Figure 11A:
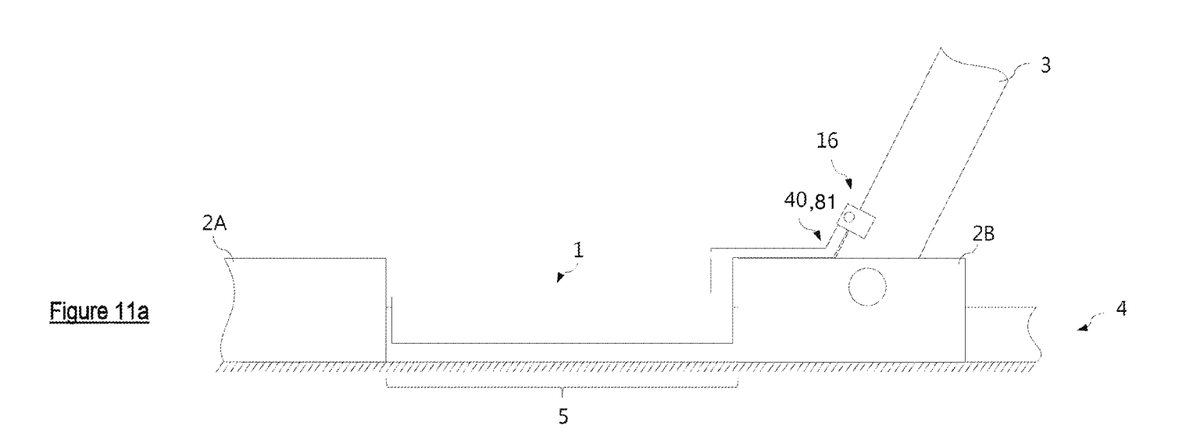
FIGS. 11a and 11b show side views of a further hinged seat track cover with a rigid seat track cover and a lever function in the covering position and stowed position with a part of the seat leg.

FIG. 11a shows, in a side view, a further advantageous embodiment of the hinged seat track cover 1. The figure shows the part of the seat fitting 2A of the front passenger seat 14 and the seat fitting 2B with the part of the seat leg 3 of the rear passenger seat 15. The seat leg 3 of the rear passenger seat 15 is positioned in the working position. The seat track cover 1 covers substantially the free region 5 of the seat track 4 between the passenger seats. In this configuration, the seat track cover 1 is connected directly to the seat leg 3 via a hinge 16. An advantageously one-piece, rigid configuration of the seat track cover 1, which is fixed to the seat leg 3 of the rear passenger seat 15, allows the upward flapping when transferring from the covering position into the stowed position via a lever action (see FIG. 11b). The attachment of the seat track cover to the seat leg 3 contains a fulcrum or lever edge 40. The fulcrum or lever edge 40 comprises a triggering mechanism 81 to initiate pivoting movement of the seat track cover 1 about the hinge 16 when the fulcrum is moved.

Figure 11B:
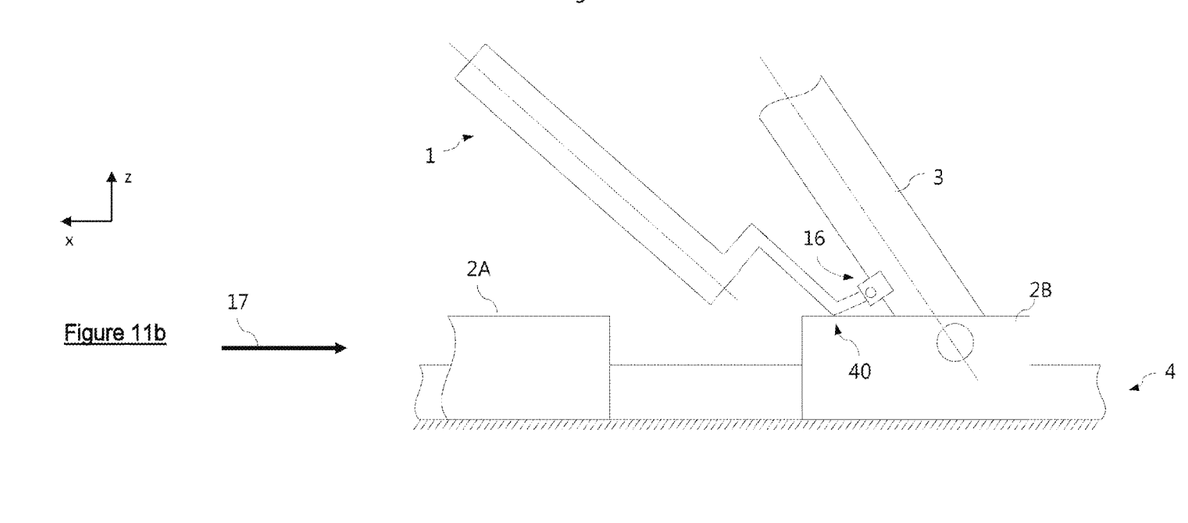

FIG. 11b shows this stowed state of the hinged seat track cover 1. The figure shows the lever action of the one-piece configuration of the seat track cover 1. When the seat fitting 2B is shifted in the shifting direction 17 counter to the x direction, the lever action via the fulcrum 40 starts. The lever action at the fulcrum 40 allows the seat track cover to flap upwards into the stowed position. When the seats are intended to be moved back into the working position, the seat leg 3 with the seat fitting 2B is moved counter to the shifting direction 17. As a result of the alteration in the position of the fulcrum/lever edge 40 in relation to the seat leg 3, the seat track cover 1 is lowered. The lowering takes place at least to a substantial extent by way of the acting weight force. In the end position (see FIG. 11a), the seat track cover 1 can be secured in the covering position by means of a securing element (not shown) arranged on the seat fitting 2A. This can take place in a similar manner by means of the closure plug 6, as shown in FIGS. 9A and 9B.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

100 Passenger seat arrangement
1 Seat track cover
1A First segment
1B Second segment
2 Seat fitting
3 Seat leg
4 Seat track
5 Free region between the passenger seats
6 Closure mechanism
6A Closure plug
7 Magnet holder
8 Torsion spring
9 Drive wheel
10 Cross connection
11 Pivot
12
13 Spring mechanism
14A Front passenger seat in the working position
14B Front passenger seat in the stowed position
15A Rear passenger seat in the working position
15B Rear passenger seat in the stowed position
16 Hinge
17 Shifting direction
18 Guide elements
19 Guide edge
20 Pushing element
21 Triggering mechanism
30 Transmission mechanism
31 Triggering mechanism
40 Fulcrum/lever edge
41 Bores in the seat track
61 Triggering mechanism
81 Triggering mechanism
91 Teeth of the drive wheel

The invention claimed is:

1. A seat track cover, configured to be positioned on a seat track for a passenger seat of an aircraft, comprising:
   the seat track cover having a pivot joint configured to mechanically couple a first end of the seat track cover to a seat leg structure of the passenger seat,
   the seat track cover configured to be arranged in a substantially parallel plane to the seat track and to take up a covering position, in a first state, which covers the seat track located therebeneath when the passenger seat is in a working position,
   the seat track cover configured to take up a stowed cover position in a second state, wherein, in the stowed cover position, the seat track cover is pivotable out of the parallel plane with respect to the seat track by way of a pivoting movement about a pivot of the pivot joint, and
   a transition from the covering position to the stowed cover position taking place via the pivoting movement about the first end of the seat track cover that is configured to mechanically couple to the seat leg structure, and
   the pivoting movement being initiated by a triggering mechanism operatively connected to the seat track cover.

2. The seat track cover according to claim 1, wherein the triggering mechanism is activated by a pushing element in a region of an opposite end of the seat track cover from the pivot joint.

3. The seat track cover according to claim 1, wherein the seat track cover is formed from a first and a second segment which are foldable into one another about a second pivot.

4. The seat track cover according to claim 3, wherein an opposite end of the seat track cover from the pivot joint is configured to be movable in a relative manner by guide elements on the seat track cover.

5. The seat track cover according to claim 1, wherein the triggering mechanism is configured to be activated by opening a closure plug for releasing an opposite end of the seat track cover from the pivot joint.

6. The seat track cover according to claim 1, wherein the triggering mechanism is configured to be activated by moving a drive wheel arranged on the seat leg structure in a manner operatively connected to a transmission mechanism for force introduction at the pivot joint.

7. The seat track cover according to claim 1, wherein the triggering mechanism is configured to be activated by moving a fulcrum arranged on the seat leg structure.

8. The seat track cover according to claim 1, wherein the pivot comprises a spring mechanism.

9. A passenger seat having a seat track cover according to claim 1.

10. A seat arrangement for a passenger cabin of an aircraft, the seat arrangement comprising:
    at least one seat track;
    a first, front passenger seat and a second, rear passenger seat;
    at least one track cover having a pivot joint configured to mechanically couple a first end of the seat track cover to a seat leg structure of the second, rear passenger seat,
    the seat track cover configured to be arranged in a substantially parallel plane to the seat track and to take up a covering position, in a first state, which covers the seat track located therebeneath when the second, rear passenger seat is in a working position,
    the seat track cover configured to take up a stowed cover position in a second state, wherein, in the stowed cover position, the seat track cover is pivotable out of the parallel plane with respect to the seat track by way of a pivoting movement about a pivot of the pivot joint, and a transition from the covering position to the stowed cover position taking place via the pivoting movement about the first end of the seat track cover that is configured to mechanically couple to the seat leg structure, and the pivoting movement being initiated by a triggering mechanism operatively connected to the seat track cover;

wherein the second passenger seat is arranged behind the first passenger seat in a longitudinal direction of the at least one seat track;

wherein the first passenger seat and the second passenger seat are configured to be moved, in each case, in the longitudinal direction of the at least one seat track in a receiving space of the at least one seat track in order to reach a stowed position;

wherein the at least one seat track cover is arranged so as to completely cover the receiving space for the at least one seat track between the first seat and the second seat in the working position, and in a stowed seat position, the at least one seat track cover is rotatable about at least one second pivot thereby uncovering the receiving space.

11. The seat arrangement according to claim 10, wherein the first, front passenger seat and the second, rear passenger seat each have the seat leg structure with a seat fitting and a seat leg which mechanically couples the first seat or the second seat to the at least one seat track;

wherein a second end of the at least one seat track cover, opposite the first end, projects in a direction of the seat leg of the first, front seat and is releasable from the at least one seat track;

wherein the first end of the at least one seat track cover projects in the direction of the seat leg of the second, rear seat and is rotatably connected to the seat leg structure of the rear seat;

wherein the at least one seat track cover is configured, upon a relative shifting movement of at least one of the first, front seat or of the movable seat leg of the rear seat in a shifting direction, to carry out the pivoting movement such that, as a result of the pivoting movement, the at least one seat track cover is moved from the first state covering the at least one seat track into the second state not covering the at least one seat track.

12. The seat arrangement according to claim 10, wherein the at least one seat track comprises a plurality of seat tracks, and the at least one seat track cover comprises a plurality of seat track covers which cover the plurality of seat tracks, the plurality of seat track covers being connected together by a cross connection.

13. The seat arrangement according to claim 10, wherein the triggering mechanism is activated by a pushing element in a region of an opposite end of the seat track cover from the pivot joint.

14. The seat arrangement according to claim 10, wherein the seat track cover is formed from a first and a second segment which are foldable into one another about a second pivot.

15. The seat arrangement according to claim 14, wherein an opposite end of the seat track cover from the pivot joint is configured to be movable in a relative manner by guide elements on the seat track cover.

16. The seat arrangement according to claim 10, wherein the triggering mechanism is configured to be activated by opening a closure plug for releasing an opposite end of the seat track cover from the pivot joint.

17. The seat arrangement according to claim 10, wherein the triggering mechanism is configured to be activated by moving a drive wheel arranged on the seat leg structure in a manner operatively connected to a transmission mechanism for force introduction at the pivot joint.

18. The seat arrangement according to claim 10, wherein the triggering mechanism is configured to be activated by moving a fulcrum arranged on the seat leg structure.

19. The seat arrangement according to claim 10, wherein the pivot comprises a spring mechanism.

* * * * *